Oct. 17, 1961 P. WEATHERS 3,005,060

SIGNAL TRANSDUCING SYSTEMS

Filed March 3, 1958 3 Sheets-Sheet 1

PAUL WEATHERS
INVENTOR.

BY

Oct. 17, 1961 P. WEATHERS 3,005,060
SIGNAL TRANSDUCING SYSTEMS
Filed March 3, 1958 3 Sheets-Sheet 2
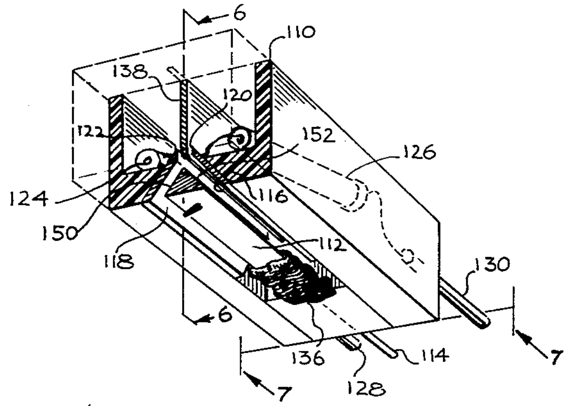
Fig. 5
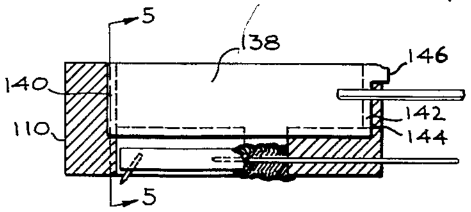
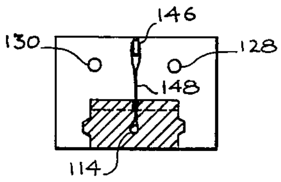
Fig. 6 Fig. 7
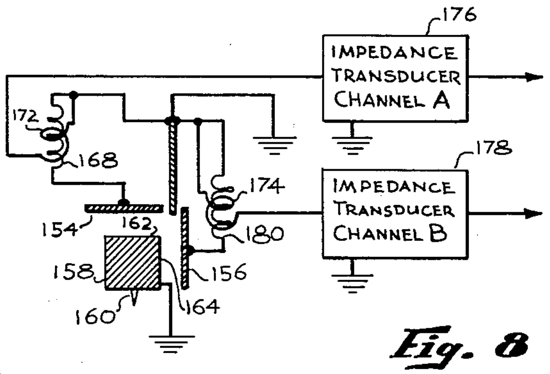
Fig. 8
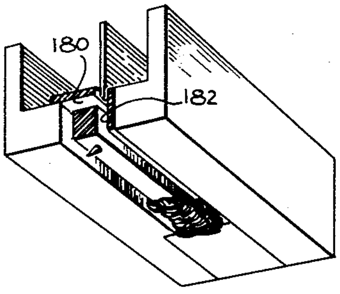
Fig. 9
PAUL WEATHERS
INVENTOR.
BY

PAUL WEATHERS
INVENTOR.

BY 3,005,060
SIGNAL TRANSDUCING SYSTEMS

Paul Weathers, 809 Station Ave., Haddon Heights, N.J.

Filed Mar. 3, 1958, Ser. No. 718,641
12 Claims. (Cl. 179—100.41)

The present invention relates to improvements in electromechanical signal transducing means and systems of a type, for example, suited for use in faithfully analyzing and/or responding to variations, undulations or modulations in the configuration, shape, or form of a groove or grooves of a grooved record bearing medium, to generate electrical signals faithfully representing said variations, undulations or modulations.

More particularly, the present invention is directed to improvements in pickup units and systems suitable for use in reproducing intelligence signals from grooved phonograph type records, said improvements providing a pickup unit and associated system which is fully compatible, without modification, with a variety of different types of single-channel and multi-channel modulation techniques which may be imposed upon a single record groove, such as vertical (depth) groove modulation, lateral groove modulation, combined vertical-lateral two-channel type stereo groove modulation and 45°–45° two-channel stereo type groove modulation.

To these ends, the present invention teaches novel improved techniques useful in electromechanically and selectively detecting variations in the mechanical displacements of various surfaces defining a groove in a groove bearing record medium, to develop electrical signals whose phase relation and magnitudes are selectively and respectively representative of variations in the positions of selected surfaces of the groove relative to some reference position.

In carrying out the preferred embodiments of the present invention, novel improvements in variable capacitance type phonograph pickup devices are employed which effectively constitute improvements over devices of the same class as, for example, disclosed in U.S. Patent No. 2,754,372, issued to Paul Weathers, July 10, 1956, entitled "Variable Capacity Phonograph Pickup Unit."

The features of the present invention, although in no way limited to the reproduction of signals from various types of grooved sound recordings, do, when adapted to such use, offer the surprising advantages which make possible a unitary phonograph record pickup system having high versatility in its use with a wide variety of different types of phonograph record groove modulation systems, without sacrificing fidelity in the playback of any particular type. The present invention, when embodying the improved features of construction pertaining to variable capacitance phonograph record pickups as disclosed herein, results in particularly improved means for reproducing laterally modulated grooved phonograph records which overcomes, to a substantial extent, some of the problems in prior art capacitance pickups attributable to electrostatic field fringing between the movable electrode and the physical extremity of a fixed electrode in the vicinity of the movable electrode.

As the art of sound recording has progressed, various types of disc phonograph records have been devised and offered to the public. The earliest forms of disc phonograph records comprised a flat circular disc of suitable material in which was formed a substantially V-shaped groove. In one system of recording, the depth of this groove is controlled or modulated in accordance with signal information as the disc is moved. This system is generally referred to as vertical groove modulation. Another popular system, now widely used in making phonograph records for home instrument use, is to vary the lateral position of the groove with respect to some mean reference position as the disc is turned. This latter system is generally referred to as lateral groove modulation. Both of these systems are essentially single channel monogroove disc recording systems, that is, only a single channel of information is recorded with the intention of later reproduction. In the more recent past, dual channel monogroove recording systems have been proposed especially adaptable for stereo sound recording and reproduction. The first of these dual channel monogroove systems comprises the simultaneous modulation of a groove both laterally and vertically, each type of modulation being controlled by a different signal channel. In the second of these dual channel monogroove systems, the walls forming the groove in the record bearing medium are disposed at substantially 45° with respect to one another. The position of each wall is then controllably displaced with respect to the bisector of the angle sustained between the walls of an unmodulated groove. The positions of the two walls are respectively controlled in accordance with a first and second signal channel such as, for example, left ear and right ear stereo sound signals.

In the past, it has been the practice for the user of these various type records to employ separate photograph pickup units for each separate type of record. One prior art scheme, however, provides a unitary pickup unit capable of reproducing either vertically or laterally modulated grooved records by employing two separate electromechanical transducers coupled to a movable beam having a stylus affixed thereto, said stylus being adapted to engage a record groove. The two electromechanical transducers were positioned at 90° with respect to one another, with one transducer being made responsive only to lateral motion of the stylus beam and the other only to vertical motion of the stylus beam. In use, only the output of one or the other of the transducers was employed in accordance with the type of modulation of the grooved record being played back. Such a pickup system, of course, automatically suggests use in conjunction with two-channel monogroove stereo recordings of the vertical-lateral variety.

Upon the advent of two-channel monogroove 45°–45° stereo type records, a new configuration of electromechanical transducers was suggested as a playback means. This arrangement comprised nothing more than shifting two transducers of a vertical-lateral type pickup, discussed above, so that each transducer was made respectively responsive to different components of stylus beam motion, each component displaced substantially 45° with respect to the surface of the record and the two components thus subtending a 90° displaced relation with respect to one another. Again, this type of pickup unit has been used exclusively for playback of two-channel 45°–45° stereo type phonograph records.

The present invention, in recognizing the need for a single unitary pickup capable of faithfully reproducing all of the abovementioned types of records, provides a novel arrangement for combining vectorially displaced signals representing separate quadraturely related components of stylus beam motion, in a phonograph pickup, into a plurality of separate signals, one signal representing vertical groove modulation, another signal representing lateral groove modulation, another signal representing changes in the position of one record groove wall and another signal representing changes in the position of the other record groove wall. By this means, a plurality of signals are made available to the user of a pickup which, through simple electrical switching, may be employed by the user in successfully reproducing single channel monogroove recordings of both the vertical and lateral variety, as well as dual channel monogroove recordings of both the 45°–45° wall modulation variety and the vertical-lateral groove modulation variety.

In carrying out the present invention, the motion of a record pickup stylus beam is resolved into two vectorial components 90° displaced with respect to one another, with one either 90° displaced with respect to the surface of the record or 45° displaced with respect to the surface of the record. This is accomplished through the use of two separate electromechanical signal transducing means coupled to the stylus beam and each responsive to only motion of the beam in a respective one of said two directions 90° displaced with respect to one another, to develop first and second corresponding output signals. Means are then provided for vectorially adding and vectorially subtracting said first and second output signals to develop third and fourth output signals. Said first, second, third and fourth output signals thereby comprise a plurality of discrete output signals, each one representing a different one of four aspects of groove modulation, namely, vertical groove modulation, lateral groove modulation, 45° modulation of one groove wall, and 45° modulation of the other groove wall. Such signals may be electrically selected at will for use in reproducing any one of the four types of monogroove records discussed above.

In a preferred form of the present invention, a novel variable capacitance type pickup is employed which permits a degree of linearity, in record groove modulation detection, permitting the above-described unitary multipurpose pickup system to be most effectively carried out. In accordance with the present invention, a preferred form of variable capacitance pickup unit comprises, a supporting structure having attached thereto a highly compliant beam, with a groove engaging stylus attached to the free end of the beam. A first and a second electrically conductive plate are then supported on respective sides of the beam and electrically insulated from one another. The plates are so oriented that the surface of the first plate forms a substantial right angle with the adjacent surface of the second plate, with the plates being each spaced from the beam by substantially the same distance to form a first and second variable capacitance elements which, taken together, have a common movable electrode comprised of the beam. Each capacitance element also has one fixed electrode comprised of the first and second conductive plates, respectively, so that the capacity of each capacitance element may be independently varied by movement of the beam along paths substantially perpendicular to the surface of its respective plate. The beam is so positioned relative to the extremities of the plates as to permit the stylus borne by the beam to engage the groove of a record so that changes in the configuration of a record groove, while the record is in motion, may be resolved into quadrature related vectors the magnitudes of which are represented by changes in the magnitudes of capacitance sustained by the first and second capacitance elements. By transducing these capacitance changes into corresponding electrical signals bearing respective linear relationships to the physical displacement of the beam relative to said two plates, the separate electrical signals may be vectorially added and subtracted as above described.

Further in accordance with the present invention, if said first and second plates are disposed at 45° with respect to the surface of the record, the pickup unit, when used with single channel laterally or vertically modulated monogroove records, provides extremely high fidelity reproduction of groove modulation. This is attributable to the fact that capacitance change between the stylus beam and either fixed plate is in accordance with the inverse squared law of beam displacement resulting in effective cancellation of even harmonic distortion components which may be attributable to errors in the tracking of the groove by the stylus. This orientation of the fixed plates also allows cancellation of all vertical components of groove motion during reproduction of laterally modulated records.

The novel features of the present invention, along with its many features of advantage, may be more clearly understood by reference to the following description, especially when read in connection with the accompanying drawings, in which:

FIGURE 5 is a perspective view, partly in cross section, illustrating one form which the variable capacitance pickup device illustrated in FIGURE 4 may take;

FIGURE 6 is an elevational view of the device illustrated in FIGURE 5, taken on a plane indicated by the dotted line connecting the arrows 6—6 and looking in the direction thereof;

FIGURE 7 is an elevational view of the device shown in FIGURE 5, taken on the plane indicated by the dotted line connecting the arrows 7—7 and looking in the direction thereof;

FIGURE 8 is a combination diagrammatic and block diagram representation of another form of variable capacitance pickup device preferably employed in the practice of the present invention;

FIGURE 9 is a perspective view, partly in cross section, illustrating one form which the variable capacitance pickup device illustrated in FIGURE 8 may take;

Figure 1:
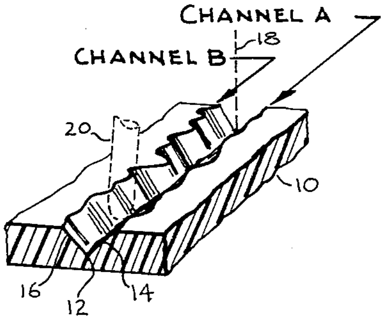
FIGURE 1 is a diagrammatic representation of the groove configuration of a two-channel 45°–45° wall modulated record groove.

Turning now to FIGURE 1, there is diagrammatically illustrated an enlarged view of a portion of a grooved record bearing medium 10. By way of illustration a groove, generally indicated at 12, is shown modulated in accordance with two separate channels of information indicated, by way of example, as originating from a channel A and a channel B. The particular form of groove modulation here illustrated is of the 45°–45° dual channel monogroove variety. In this form of modulation, the walls 14 and 16 of the relatively V-shaped groove 12 subtend an angle of 45° with respect to one another. The position of the wall 14 relative to a bisector 18, which for purposes of reference represents a line bisecting the angle formed by the walls of the groove 12 when bearing no modulation, is modulated in accordance with information delivered by a channel A. Likewise, the position of wall 16 is modulated with respect to the reference 18, in accordance with signal information delivered by channel B. It is present-day practice, when adapting the modulation system described in FIGURE 1 to the recording of stereo sound information, wherein channel A may represent left ear information and channel B may represent right ear information, to relate the relative direction of wall modulations so that "in phase" signals appearing at the input of channels A and B will produce shifting of the walls 14 and 16 in the same direction. This is to permit a standard phonograph pickup, designed solely for lateral groove modulation response, to reproduce a dual channel monogroove record on a mixed channel basis whereby the output signal from the pickup will represent a mixture of both left ear and right ear stereo information. The relative positive of a pickup stylus, engaging the groove 12 for tracking variations in the configuration thereof, is illustrated by the form indicated by the dotted line 20.

Figure 2:
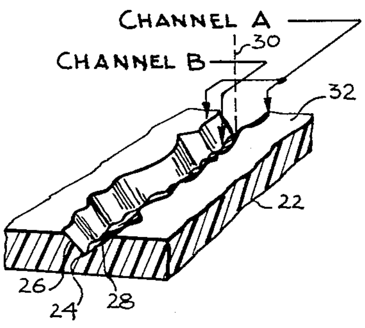
FIGURE 2 is a diagrammatic representation of a two-channel vertical-lateral modulated record groove.

Turning to FIGURE 2, there is illustrated another form of dual channel monogroove modulation technique. The recording medium 22 has impressed therein a V-shaped groove 24, defined by walls 26 and 28. Information from a channel A is impressed on the medium by varying the lateral position of the groove relative to a bisector 30. The bisector 30 corresponds to the bisection of the angle sustained by the groove 24 when in an unmodulated condition. This type of modulation corresponds to a conventional lateral groove modulation employed in present-day LP records. Information from channel B is impressed on the medium 20, however, by controlling the effective depth of the groove 24 with respect to the surface 32 of the recording medium. This type of groove modulation is generally referred to as vertical or "hill and dale" modulation, as typified by some forms of commercial broadcast sound disc transcriptions.

Figures 3, 4:
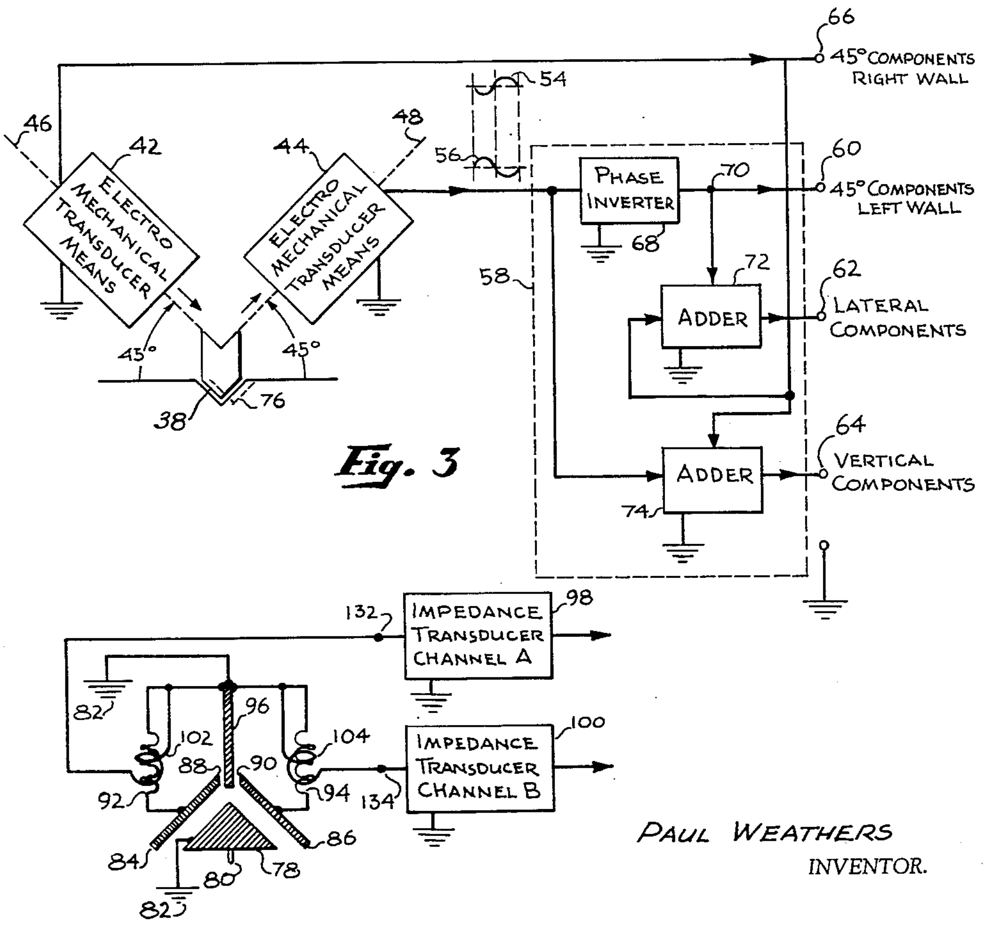
FIGURE 3 is a diagrammatic and block representation illustrating the principles of the present invention.
FIGURE 4 is a combination diagrammatic and schematic representation of a novel form of variable capacitance pickup device preferably employed in the practice of the present invention.

In order to simultaneously reproduce both channel A and channel B information from each of the two types of records illustrated in FIGURES 1 and 2, without suffering substantial cross talk between the channels, the present invention contemplates the arrangement diagrammatically shown in FIGURE 3. Here, a record bearing medium 34 is illustrated in cross section, having a groove 36, the configuration of which may vary in accordance with any of the modes of groove modulation shown in FIGURES 1 and 2. The stylus 38 has been shown as engaging the groove 36. As the medium 34 is moved relative to the stylus 38, the walls of the groove 36 may move in a lateral direction, a vertical direction, or in separate directions displaced 45° with respect to the surface 40 of the medium, the particular change in the configuration of the groove 36 depending upon the particular mode of modulation. To faithfully reproduce the signal information recorded on the medium 34, regardless of the mode of modulation which is represented, the present invention contemplates use of a first and second electromechanical transducing means, indicated in block form at 42 and 44, respectively. The transducing means 42 and 44 may be of any convenient type, such as piezoelectric, electrodynamic, variable reluctance, or variable capacitance. These transducing means are so related to the stylus 38 as to respond to motion thereof to and fro along but two directions generally indicated by the dotted lines 46 and 48. These lines of direction are shown to be 45° displaced with respect to the surface 40 of the recording medium 34. The transducing means 42 and 44 are of a character which produces, at their respective output terminals 50 and 52, alternating current signals, such as 54 and 56, which vectorially represent motion of the stylus 38 as resolved into two vectors displaced from one another by an angle of 90°. This quadrature electrical information, available at terminals 50 and 52, is then applied to a combining network 58 to produce a plurality of output signals at terminals 60, 62 and 64. These signals at 60, 62 and 64, taken in combination with the signal 54 as applied to terminal 66, constitute faithful representations of any of the forms of modulation indicated in FIGURES 1 and 2; that is, vertical, lateral, 45° modulation of one groove, and 45° modulation of the other groove. This is accomplished, in accordance with the present invention, by vectorially adding the two signals 54 and 56 to produce one output signal, and vectorially subtracting the two signals to form another output signal. By way of example, the combining network 54, therefore, comprises a phase inverter 68 which provides, at its output terminal 70, a phase inverted version of the signal 56 which is, in turn, applied to output terminal 60. This signal is, by means of an adder circuit 72, vectorially added to the signal 54 to produce an output signal at terminal 62. Similarly, signal 54 is added to the signal 56 by means of an adder 74 to produce an output signal at terminal 64. The combination of the phase inverter 68 and the adder 72, of course, can be seen to constitute means for subtractively combining the signals 54 and 56, while the adder 74 accomplishes vectorial addition of the signals 54 and 56.

If the transducers 42 and 44, in FIGURE 3, are so constructed that their output signals 54 and 56 are 180° out of phase for a purely lateral movement of the groove 36 to a position such as shown by the dotted line 76, then the signal appearing at terminal 66 will correspond to 45° modulation of one groove wall, the signal appearing at terminal 60 will correspond to 45° modulation of the other groove wall, with the signals appearing at 62 and 64 corresponding to lateral components of groove modulation, and vertical components of groove modulation, respectively. More specifically, if the arrangement of FIGURE 3 is employed for the reproduction of a standard lateral modulated grooved record, reproduced signal intelligence will appear only at terminal 62. If a so-called "hill and dale" or vertically modulated grooved record is reproduced, signal intelligence will appear only at terminal 64. If a two-channel monogroove stereo record is reproduced, signal intelligence corresponding to left ear and right ear information will appear only at terminals 62 and 64. Finally, if a 45°–45° dual channel stereo monogroove record is reproduced by the system of FIGURE 3, signal information corresponding to left ear and right ear sound will appear only at terminals 60 and 66.

It is thus seen that, in accordance with one aspect of the present invention, a novel phonograph pickup system has been provided which has high versatility in its ability to successfully reproduce a variety of different type grooved records, with no need of modification or adjustment by the user to adapt it for playing of any particular type of record.

In order to best carry out the novel features of the present invention as illustrated in FIGURE 3, an improved form of variable capacitance pickup unit is preferred. This unit is diagrammatically indicated in FIGURE 4. Here a movable beam member 78 is shown, having affixed thereto a stylus 80 suitable for engaging the groove of a grooved record medium. The beam 78 is provided with at least a partially conductive electrical surface which is connected to a reference ground, generally indicated at 82. Positioned to the right and left of the beam 78 are two electrically conductive plates 84 and 86, each electrically insulated from one another and the reference ground. By way of example, the plates 84 and 86 are shown positioned in a substantially 90° displaced relationship with respect to one another and spaced apart at the apex of this included angle to form a gap indicated between the edges 88 and 90 of the plates. Thus, there is provided two variable capacitance elements, the first of said elements comprising the beam 78 and plate 84 taken in combination, and the second comprising the beam 78 and the plate 86 taken in combination. These two variable capacitance elements have, thus, a common movable electrode comprised of the beam 78.

In accordance with the present invention, the spacing of the beam 78 with respect to the plates 84 and 86 and the relative sizes of the beam 78 and the plates 84 and 86 are so adjusted, relative to the gap defined between edges 88 and 90, that the maximum value of capacity produced by either variable capacitance element in the operation of the pickup unit is substantially greater than the value of capacity existing between the plates 84 and 86.

In order to transduce the separate capacitance changes between the beam 78 and the two plates 84 and 86, inductors 92 and 94 are connected between plates 84 and 86 to the reference ground again indicated at 82. Thus, two tuned circuits are provided, the resonant frequencies of which are varied in accordance with the position of the beam 78 with respect to the plates 84 and 86. In order to minimize changes in the resonant frequency of one tuned circuit from affecting the resonant frequency of the other tuned circuit, it is contemplated, by the present invention, that a third conductive plate or shield member 96 be introduced between the two inductors 92 and 94 and interposed between the plates 84 and 86 within the gap defined by the edges of the extremities of said plates 88 and 90.

As the resonant frequency of each tuned circuit is changed, the terminal impedance thereof will also change. This impedance may be detected and transduced into representative electrical signals by means of a first and second impedance transducer channels indicated at 98 and 100, respectively. The impedance transducers 98 and 100 are preferably oscillators of the tuned grid tuned plate variety, electrically coupled to the two tuned circuits of the pickup unit by electromagnetic coupling provided by the wire turns 102 and 104, respectively. An impedance transducing arrangement, such as indicated by the oscillator circuit shown in the above-referenced U.S. Patent No. 2,754,372, is eminently suited for this purpose. Thus, the output signals appearing at terminals 106 and 108 of the impedance transducers 98 and 100 will generally correspond to the signals 54 and 56 indicated in FIGURE 3.

One form which the variable capacitance pickup unit of FIGURE 4 may take is structurally indicated in the showing of FIGURE 5, wherein a supporting member 110, comprised preferably of a low dielectric high electrical resistance material, is shown supporting a highly compliant movable beam 112. The surface of the beam 112 is made at least partially conductive to electrical current, and such surface is electrically communicated to an output terminal 114 held by the supporting structure 110. Attached to the beam 112 is a stylus 114 adapted for engaging a groove of a grooved recording medium. A first and a second electrically conductive plates, indicated at 116 and 118 respectively, are supported by the structure 110 in electrically insulating spaced apart skewed relation to one another. The plate 116 is positioned on one side of the beam 112 and spaced apart therefrom, while the other plate 118 is positioned at the other side of the beam 112 and spaced apart therefrom. The sides of the plates 116 and 118, which are immediately adjacent the beam 112, define an acute angle which is preferably, and by way of example, established at 90°. The adjacent edges 120 and 122 of the plates at the apex of the angle defined by the plates are spaced apart to form a gap corresponding to the gap indicated between the edges 88 and 90 in FIGURE 4. The inductors 92 and 94, along with the coupling windings 102 and 104 shown in FIGURE 4, are physically represented at 124 and 126 in FIGURE 5. The terminals 128 and 130 of the unit shown in FIGURE 5 correspond, respectively, to the terminals 132 and 134 indicated in FIGURE 4. Damping material connected between the beam 112 and the structure 110 is indicated at 136 and may be comprised of a silicone substance. A conductive plate or shield member 138, in FIGURE 5, which extends between the two plates 116 and 118 but in an insulated relation to both, corresponds generally to the plate or shield 96 illustrated in FIGURE 4.

As shown in FIGURE 6, the plate 138 is supported by a groove 140 in the end of the structure 110, and a supporting ear 142 thereof by a groove in the structure indicated at 144. An ear 146 of the conductive plate 138 extends beyond and outside the structure 110 to form a terminal which permits the ear 146 to be electrically connected with the conductive surface of the beam 112. This is shown in FIGURE 7 where the ear 146 is connected to the terminal 114 by means of a wire conductor 148. Thus, the terminal 146 or 114 may be connected to reference ground, as indicated in FIGURE 4, and the terminals 128 and 130 connected to suitable impedance transducing means as indicated in FIGURE 4.

A novel feature of the structure shown in FIGURE 5 resides in shaping the beam 112 so that two contiguous surfaces thereof, such as 150 and 152, sustain the same angle between one another as do the plates 116 and 118. This tends to maximize changes in the resonant frequency of the tuned circuits held by the unit in the face of any given movement of the stylus beam 112.

Another novel feature of the arrangement shown in FIGURE 5 resides in the extension of the shielding plate 138 in a direction generally away from the gap defined between the edges 120 and 122, and sufficiently into the supporting structure 110 to form two compartments for holding the coils 124 and 126, respectively. By thus positioning the shield 138, not only are the plates 116 and 118 effectively shielded from one another, but also the coils 124 and 126. This construction tends to minimize cross talk between the channels of a two-channel monogroove recording.

As referred to above, another novel feature of the arrangement shown in FIGURE 5 resides in the fact that, since the fixed electrode plates 116 and 118 are each disposed at 45° with respect to the surface of a record to be reproduced, vertical and lateral component signals, derived from the pickup unit as generally indicated in FIGURE 3, will be substantially free of even harmonic distortion. Moreover, whereas in the prior art single electrode variable capacitance pickups have been quite effective, as for example shown in the above-referenced U.S. patent to Paul Weathers, the arrangement of FIGURE 5 offers an improvement thereover. In practice it is found that, in order for the stylus 114 to successfully track the grooves of a record without the lower extremities of plates 116 and 118 conditionally touching the surface of the record, the lower extremity of the stylus beam 112 must protrude below the extremities of plates 116 and 118 by a substantial amount. The electrostatic field between the stylus beam 112 and one fixed plate thereby tends to fringe and destroy an ideal inverse square change of capacitance for displacements of the beam 112. However, in the arrangement of FIGURE 5 where two plates, such as 116 and 118, are employed and a combining network such as indicated in FIGURE 3 is utilized, such distortion as would otherwise be produced by such flux fringing is effectively cancelled.

Although the arrangement shown in FIGURE 5 constitutes a preferred form of variable capacitance pickup device construction, in accordance with the present invention, the same principles illustrated in FIGURE 4 and embodied in the structure of FIGURE 5 may be advantageously employed in another arrangement, as indicated in FIGURE 8.

The arrangement shown in FIGURE 8 can be seen to be substantially identical to that shown in FIGURE 4, except that the fixed plates 154 and 156, generally corresponding to plates 84 and 86 in FIGURE 4, have been each displaced 45° from their positions shown in FIGURE 4. Plates 154 and 156 in FIGURE 8 will define a substantially 90° angle with respect to one another, with one of the plates, 156, disposed at right angles with respect to the surface of a record. The stylus beam 158 carrying the stylus 160 may now be made rectangular in shape, with the surfaces 162 and 164 respectively cooperating with the plates 154 and 156 to define variable capacitance elements. The surface of the beam 158 is made at least partially conductive to electrical current and is connected with a reference ground indicated at 166. The inductors 168 and 170 generally correspond to inductors 92 and 94 in FIGURE 4. Likewise, the coupling turns 172 and 174 in FIGURE 8 generally correspond to the turns 102 and 104 in FIGURE 4. The impedance transducers 176 and 178 in FIGURE 8 may be identical in nature to those employed at 98 and 100 in FIGURE 4. It will be appreciated that the arrangement shown in FIGURE 8 is ideally suited to the reproduction of either laterally modulated grooved records or vertically modulated grooved records, as well as dual channel monogroove stereo records.

The structure in FIGURE 9 illustrates a preferred way of embodying the principles indicated diagrammatically in FIGURE 8. The pickup unit shown in FIGURE 9 is, likewise, substantially the same as the pickup unit illustrated in FIGURE 5. The only difference in the construction of the two pickup units resides in the fact that, whereas plates 116 and 118 in the arrangement of FIGURE 5 are each disposed 45° with respect to the surface of the record to be reproduced, corresponding plates 180 and 182 in FIGURE 9 are respectively parallel and perpendicular to the surface of a record to be reproduced. In view of the similarity of structure otherwise apparent in the arrangement depicted in FIGURE 5 and FIGURE 9, further description of FIGURE 9 becomes unnecessary.

Figure 10:
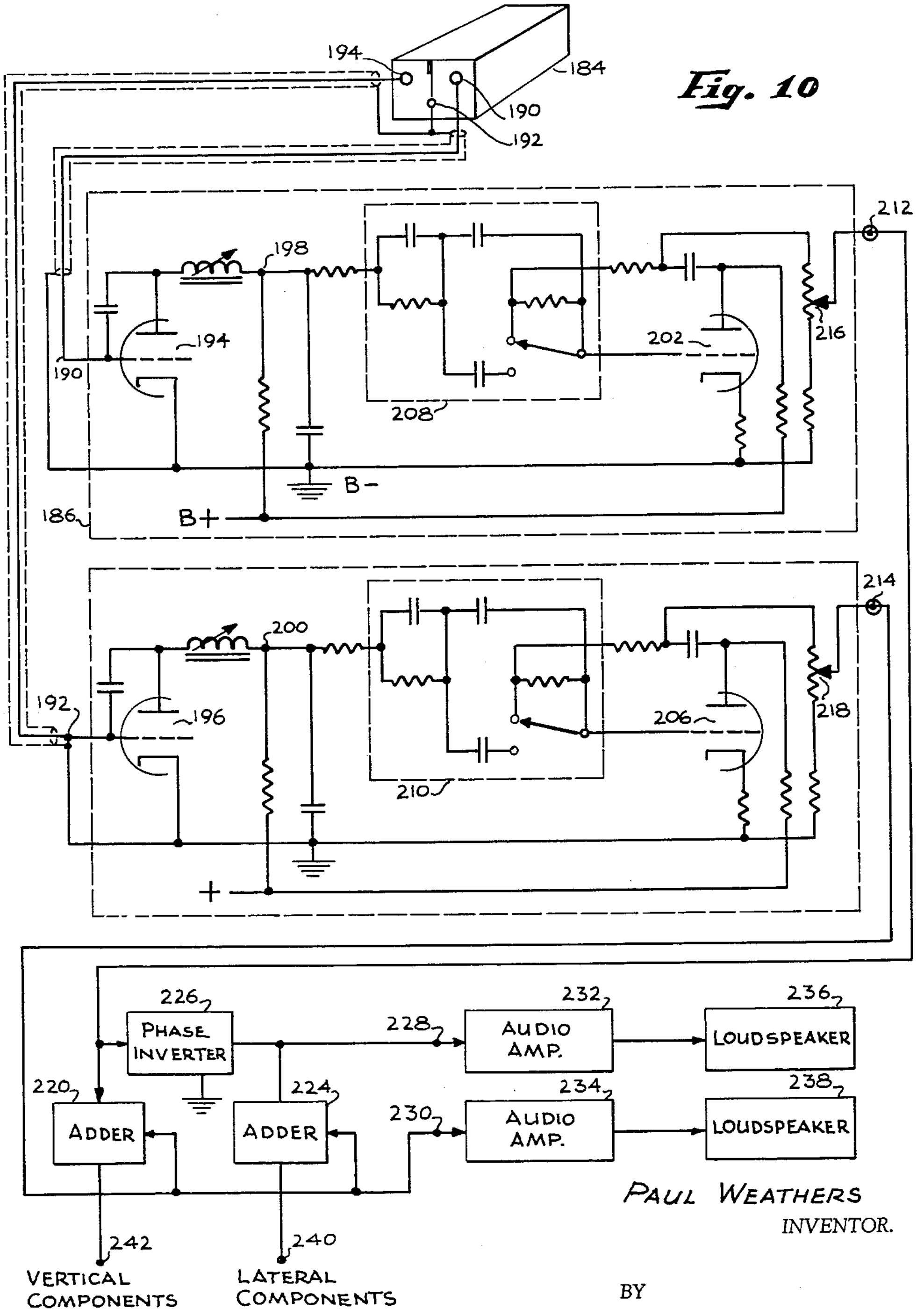
FIGURE 10 is a combination diagrammatic, schematic, and block diagram representation of a workable embodiment of the present invention, with specific means shown for detecting impedance variations attributable to capacitance changes in a pickup unit of the general type shown in FIGURE 5.

In order to more clearly understand how a variable capacitance pickup of the type shown in FIGURE 5 may be successfully employed in realizing the advantages disclosed in connection with the arrangement of FIGURE 3, a complete pickup system is shown in FIGURE 10. In FIGURE 10, a variable capacitance pickup unit 184 has been indicated connected with two impedance transducing channels, generally shown in dotted line areas 186 and 188. The pickup device 184 may be substantially identical to that shown in FIGURE 5, with output terminals 190, 192 and 194 in FIGURE 10, corresponding to output terminals 130, 114 and 128 in FIGURE 5, respectively. As indicated in FIGURES 4 and 5, each of the resonant circuits in the pickup unit 184 is inductively coupled to the input terminals 190 and 192, respectively, of the impedance transducing channels 186 and 188, respectively. Vacuum tube elements 194 and 196, respectively shown in the two channels, are so connected as to form tuned grid tuned plate oscillators, the operating frequencies of which are dependent upon and become a function of the impedance appearing at the respective terminals 190 and 192. As indicated in the above U.S. Patent No. 2,754,372 to Paul Weathers, such an oscillator circuit may be made to produce linear changes in its power supply demand as a function of mechanical displacement of the stylus in a pickup unit such as 184. There will therefore appear at terminals 198 and 200 alternating current signals representing highly faithful reproductions of the mechanical movement of the pickup stylus beam to and fro along directions 45° displaced with respect to the surface of the record. These alternating current signals may then be applied to conventional vacuum tube amplifiers 202 and 206 through coupling networks generally indicated at 208 and 210, respectively. Amplified signals appearing at output terminals 212 and 214 will, therefore, correspond to the type of signals appearing at terminals 66 and 60 in the arrangement of FIGURE 3. Potentiometers 216 and 218 provide means for adjusting the relative amplitudes of the output signals so as to afford the proper balance between them during the subtractive and additive vectorial combination thereof in the manner shown in FIGURE 3. In FIGURE 10, the vectorial addition and subtraction is accomplished in adders 220 and 224, both of which receive output signals from the terminals 214 of the transducer 188. Adder 220 directly receives the output signal from terminal 212 of the transducing channel 186 for additive combination with the output signal of channel 188. Adder 224, however, receives a phase inverted version of the output signal from channel 186, as accomplished by a conventional form of phase inverter. Thus, the adder 224 provides a subtractive process of vectorial combination. The input terminals 228 and 230 of audio amplifiers 232 and 234 may then be directly connected to the output of the phase inverter 226 and the output of channel 188 as available at terminal 214. With such an arrangement, the playing of 45°–45° dual channel monogroove stereo records by the pickup unit 184, in FIGURE 10, will produce properly phased signals for application to loud speakers 236 and 238. In such an arrangement, speakers 236 and 238 may, respectively, correspond to sound sources intended for direction to the left ear and right ear, respectively. Should, however, a conventional single channel monogroove lateral recording be reproduced by the pickup 184, both audio amplifiers and speaker systems may be used simultaneously, or the signal appearing at the output terminal 240 of adder 224 applied to either or both amplifiers. On the other hand, should a single channel vertically modulated monogroove record be reproduced by the pickup 184 in FIGURE 10, the output terminal 242 of adder 220 may be applied to one or both of the audio amplifiers 232 and 234 for reproduction. Should a two-channel monogrove recording of the vertical-lateral stereo variety be reproduced by the pickup 184, output terminals 240 and 242 in FIGURE 10 may be directly applied to the audio amplifier input terminals 228 and 230 for stereo reproduction of the record.

Having thus described the invention, what is claimed is:

1. A variable capacity pickup unit, comprising in combination: a supporting structure; a depending highly compliant movable beam carried by said structure and having an electrically conductive surface, said beam having mounted therein a stylus element for engaging a groove of a movable record bearing medium having a groove, the configuration of which is varied in accordance with recorded information as said medium is moved; a first and a second electrically conductive plate supported by said structure in electrically insulating spaced apart relation to one another, with the surface of the first plate forming a substantially right angle with the adjacent surface of the second plate, said plates, as supported by said structure, being each spaced from said beam to form a first and a second variable capacitance element together having a common movable electrode comprising said beam, and each capacitance element having one fixed electrode comprised of said first and second conductive plates, respectively, so that the capacity of each capacitance element may be independently varied by movement of said beam along paths substantially perpendicular to the surface of its respective plate, said beam being so positioned between said plates as to permit said stylus to engage a groove of a grooved record bearing medium so as to permit changes in the configuration of said groove, while said medium is in motion, to be resolved into quadrature related vectors the magnitudes of which are represented by changes in the magnitudes of capacitance sustained by said first and second capacitance elements; and at least three access terminals carried by said structure and respectively coupled to said beam, said first plate, and said second plate to permit capacitance changes in said first and second variable capacitance elements to be separately detected at positions external to said pickup unit.

2. Apparatus according to claim 1 wherein said beam is shapened to sustain at least two contiguous substantially planar surfaces disposed at right angles to one another with each immediately adjacent and substantially parallel to a fixed plate.

3. A variable capacity pickup unit, comprising in combination: a supporting structure; a depending highly compliant movable beam carried by said structure and having an electrically conductive surface, said beam having mounted therein a stylus element for engaging a groove of a movable record bearing medium having a groove, the configuration of which is varied in accordance with recorded information as said medium is moved; a first and a second electrically conductive plate supported by said structure in electrically insulating spaced apart relation to one another, with the surface of the first plate forming a substantially right angle with the adjacent surface of the second plate, said plates, as supported by said structure, being each spaced from said beam to form a first and a second variable capacitance element together having a common movable electrode comprising said beam, and each capacitance element having one fixed electrode comprised of said first and second conductive plates, respectively, so that the capacity of each capacitance element may be independently varied by movement of said beam along paths substantially perpendicular to the surface of its respective plate, said beam being so positioned between said plates as to permit said stylus to engage a groove of a grooved record bearing medium so as to permit changes in the configuration of said groove, while said medium is in motion, to be resolved into quadrature related vectors the magnitudes of which are represented by changes in the magnitudes of capacitance sustained by said first and second capacitance elements; a first inductor electrically connected to said plate and said beam to form a first tuned circuit the resonant frequency of which is varied as a function of variations in the capacitance of said first variable capacitance element; a second inductor electrically connected between said second plate and said beam to form a second tuned circuit the resonant frequency of which is a function of variations in the capacitance of said second variable capacitance element; first coupling means carried by said supporting structure and coupled with said first inductor to provide a low impedance coupling to said first tuned circuit; second coupling means carried by said supporting structure and coupled with said second inductor to provide a low impedance coupling to said second tuned circuit; and at least three access terminals, carried by said structure and electrically connected with said first and second coupling means, to permit variations in the tuning of said first and second tuned circuits to be detected at positions external to said pickup unit.

4. A variable capacity pickup unit, comprising in combination: a supporting structure; a depending highly compliant movable beam carried by said structure and having an electrically conductive surface, said beam having mounted therein a stylus element for engaging a groove of a movable record bearing medium having a groove, the configuration of which is varied in accordance with recorded information as said medium is moved; a first and a second electrically conductive plate supported by said structure in electrically insulating spaced apart relation to each other, with the surface of the first plate forming a substantially right angle with the adjacent surface of the second plate, said plates thereby defining the relative positions of two sides of a triangle with those edges of said plates most immediately adjacent one another being separated to form a gap of predetermined dimension so as to define a substantially fixed value of electrical capacitance as measurable between said first and said second plates, said plates as supported by said structure also being each spaced from said beam to form a first and a second variable capacitance element which together have a common movable electrode comprised of said beam, and each capacitance element having one fixed electrode comprised of said first and said second conductive plates respectively, so that the value of capacitance sustained by each capacitance element may be independently varied by movement of said beam along paths substantially perpendicular to the surface of its respective plate, the relative dimensions of said beam and said plates, the relative spacing of said plates and the nominal spacing of said beam with respect to said plates, being established such that the maximum value of capacitance afforded by either variable capacitance element is substantially greater than said fixed value of electrical capacitance.

5. A variable capacitance pickup assembly, comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining an acute angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recorded medium; and at least first, second and third electrical access terminals supported by said structure and electrically coupled, respectively, to said first plate, the conductive surface of said beam, and said second plate, so that variations in the configuration of a moving record groove, while engaged by said stylus, may be detected and resolved into two vectorial quantities of variable amplitude displaced from each other by said acute angle, the magnitudes of said quantities being represented by the magnitudes of electrical impedance appearing between said first and second terminals taken together and between said second and third terminals taken together.

6. A variable capacitance pickup assembly, comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining a substantially 90° angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recorded medium; and at least first, second and third electrical access terminals supported by said structure and electrically coupled, respectively, to said first plate, the conductive surface of said beam, and said second plate, so that variations in the configuration of a moving record groove, while engaged by said stylus, may be detected and resolved into two vectorial quantities of variable amplitude displaced from each other by substantially 90°, the magnitudes of said vectorial quantities being represented by the magnitudes of electrical impedance appearing between said first and second terminals taken together and between said second and third terminals taken together.

7. A variable capacitance pickup assembly, comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining an acute angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recorded medium; a third electrically conductive plate member having one edge thereof interposed between said two plates and electrically insulated therefrom as a shielding element, the bulk of said third plate extending from said gap in a direction away from said beam; means for electrically coupling said third plate member to said beam; and at least first, second and third electrical access terminals supported by said structure and electrically coupled, respectively, to said first plate, the conductive surface of said beam, and said second plate, so that variations in the configuration of a moving record groove, while engaged by said stylus, may be detected and resolved into two vectorial quantities of variable amplitude displaced from each other by said acute angle, the magnitudes of said vectorial quantities being represented by the magnitudes of electrical impedance appearing between said first and second terminals taken together and between said second and third terminals taken together.

8. A variable capacitance pickup assembly, comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining an acute angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recording medium, the mean spacing between said plates and said beam, and the physical size of said plates, said beam, and said gap, being so established and related to one another as to render the largest value of electrical capacitance appearing between said beam and either of said plates, larger than the electrical capacitance appearing between said two plates; and at least first, second and third electrical access terminals supported by said structure and electrically coupled, respectively, to said first plate, the conductive surface of said beam, and said second plate, so that variations in the configuration of a moving record groove, while engaged by said stylus, may be detected and resolved into two vectorial quantities of variable amplitude displaced from each other by said acute angle, the magnitudes of said vectorial quantities being represented by the magnitudes of electrical impedance appearing between said first and second terminals taken together and between said second and third terminals taken together.

9. A variable capacitance pickup assembly, comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining an acute angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recording medium; an electrical access terminal supported by said structure and electrically coupled to said first plate, the conductive surface of said beam, and said second plate, so that variations in the configuration of a moving record groove, while engaged by said stylus, may be detected and resolved into two vectorial quantities of variable amplitude displaced from each other by said acute angle, the magnitudes of said quantities being respectively represented by the character of electrical impedance appearing between a first pair of said terminals electrically coupled between said beam and said first plate, and by the character of electrical impedance appearing between a second pair of said terminals electrically coupled between said beam and said second plate.

10. A variable capacitance pickup assembly, comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining an acute angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recording medium; an electrical access terminal supported by said structure and electrically coupled to said first plate, the conductive surface of said beam, and said second plate, so that variations in the configuration of a moving record groove, while engaged by said stylus, may be detected and resolved into two vectorial quantities of variable amplitude displaced from each other by said acute angle, the magnitudes of said quantities being respectively represented by the character of electrical impedance appearing between a first pair of said terminals electrically coupled between said beam and said first plate, and by the character of electrical impedance appearing between a second pair of said terminals electrically coupled between said beam and said second plate; and transducing means coupled to said first and second pairs of terminals for transducing the impedance appearing across each pair of terminals into first and second separate electrical signals, each representing the character of impedance appearing across said respective pairs of terminals, variations in the amplitudes of said signals also depicting corresponding changes in the magnitudes of said vectors.

11. A pickup system, compatible for use with both standard single-channel monogroove laterally modulated sound records and two-channel monogroove stereo sound records of the 45°–45° type, said stereo record bearing substantially a V-shaped groove, each wall of which subtends a substantially 45° angle with respect to the surface of the record, whereby said walls together subtend a substantially 90° angle with respect to one another, the position of each wall relative to the bisector of the angle subtended by an unmodulated groove being varied respectively in accordance with signal information depicting the first and second channels of a stereo sound signal source, respectively, the phase of relative wall modulations being substantially 180° displaced with respect to one another for "in phase" signal information delivered by said signal source, to permit useful mixed channel playback of said stereo record by a phonograph pickup designed primarily for playback of standard laterally modulated monogroove sound records, said pickup system comprising in combination: a supporting structure; a depending highly compliant movable beam having a surface which is at least partially conductive to electrical current, said beam being carried by said structure, only one extremity of said beam being fixed to said structure so as to permit the other extremity of said beam freedom of movement; a stylus means fixed to said beam in the vicinity of its free extremity, said stylus extending in a direction generally away from said structure in a manner permitting its engagement with the groove of a grooved record bearing medium, the configuration of the groove of said medium varying during motion of said medium in accordance with recorded signal information; a first and second electrically conductive plates supported by said structure in electrically insulating spaced apart skewed relation to one another with one plate positioned on one side of said beam and spaced apart therefrom, and the other plate positioned on the other side of said beam and spaced apart therefrom, the sides of said plates immediately adjacent said beam defining a substantially 90° angle which effectively embraces said beam, with adjacent edges of said plates, at the apex of said angle, being spaced apart to form a gap located on the structure side of said beam, with said stylus extending beyond those extremities of said plates most remote from said apex to permit engagement, by said stylus, of a groove in a recording medium; at least first, second and third electrical access terminals supported by said structure and electrically coupled, respectively, to said first plate, the conductive surface of said beam, and said second plate, so that variations in the configuration of a moving record groove, while engaged by said stylus, may be detected and resolved into two vectorial quantities of variable amplitude displaced from each other by substantially 90°, the magnitudes of said vectorial quantities being represented by the magnitudes of electrical impedance appearing between said first and second terminals taken together and between said second and third terminals taken together; and means coupled with said access terminals for transducing electrical impedance variations appearing between said first and second terminals into a first output signal and impedance variations appearing between said second and third terminals into a second output signal, said transducing means being operative to relate the phase of said first and second output signals relative to signal reference datum such that they are in phase with respect to datum in response to simultaneous modulation of said grooved walls corresponding to "in phase" signals delivered by said signal source.

12. A phonograph pickup system suited for reproduction of single and dual channel monogroove records embodying vertical, lateral and 45° wall modulation of the record grooves, comprising in combination: a supporting structure; a depending highly compliant movable beam carried by said structure, only one extremity of said beam being fixed to said structure so as to permit the other extremity of said beam freedom of movement from a nominal rest position; a stylus means fixed to said beam in the vicinity of its free extremity, said stylus extending in a direction generally away from said structure in a manner permitting its engagement with a groove of a grooved record bearing medium; means carried at least in part by said structure and responsive to beam motion to produce a first and a second electrical signal representing vectorial displacements of said beam, from its nominal rest position, to and fro along but two respective directions displaced from one another by substantially 90° and each direction substantially displaced 45° with respect to the surface of a record being reproduced; means for selectively combining said first and second electrical signals in a selected vectorial relation with respect to one another to form a third electrical signal representing vectorial displacements of said beam, from its nominal rest position, to and fro along a third direction displaced 45° from both of said aforementioned two respective directions; and means for delivering said first, second and third electrical signals independently of one another to represent respective independent modulation of the separate walls of a record groove along direction 45° displaced with respect to the surface of a record as well as groove modulations of a record in either vertical or lateral directions.

References Cited in the file of this patent

UNITED STATES PATENTS

| | | |
|---|---|---|
| 2,369,622 | Toulon | Feb. 13, 1945 |
| 2,754,372 | Weathers | July 10, 1956 |
| 2,864,897 | Kaar | Dec. 16, 1958 |